United States Patent
Al Hamouz et al.

(10) Patent No.: US 10,364,397 B2
(45) Date of Patent: Jul. 30, 2019

(54) MERCURY REMOVAL FROM LIQUID HYDROCARBONS BY 1,4-BENZENEDIAMINE ALKYLDIAMINE CROSS-LINKED POLYMERS

(71) Applicant: KING FAHD UNIVERSITY OF PETROLEUM AND MINERALS, Dhahran (SA)

(72) Inventors: Othman Charles Sadeq Othman Al Hamouz, Dhahran (SA); Tawfik Abdo Saleh, Dhahran (SA); Thomas Garrison, Dhahran (SA); Michael Fraim, Dhahran (SA); Mohamed Abdel-Aziz Habib, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 18 days.

(21) Appl. No.: 15/651,857

(22) Filed: Jul. 17, 2017

(65) Prior Publication Data

US 2018/0298290 A1 Oct. 18, 2018

Related U.S. Application Data

(60) Provisional application No. 62/486,841, filed on Apr. 18, 2017.

(51) Int. Cl.
| | | |
|---|---|---|
| *B01D 15/08* | (2006.01) | |
| *C10G 25/00* | (2006.01) | |
| *C10L 1/04* | (2006.01) | |
| *C10L 1/06* | (2006.01) | |
| *C08G 73/02* | (2006.01) | |

(Continued)

(52) U.S. Cl.
CPC ........... *C10G 25/003* (2013.01); *B01D 15/00* (2013.01); *B01D 15/08* (2013.01); *B01J 20/261* (2013.01); *B01J 20/262* (2013.01); *B01J 20/264* (2013.01); *B01J 20/267* (2013.01); *B01J 20/28097* (2013.01); *B01J 20/3204* (2013.01); *B01J 20/3206* (2013.01); *B01J 20/327* (2013.01);
(Continued)

(58) Field of Classification Search
None
See application file for complete search history.

(56) References Cited

U.S. PATENT DOCUMENTS

| | | | | |
|---|---|---|---|---|
| 3,220,984 A | * | 11/1965 | Tashlick | ................. C08G 65/34 528/391 |
| 4,032,482 A | | 6/1977 | Moriya et al. | |

(Continued)

FOREIGN PATENT DOCUMENTS

JP 3150173 B2 1/2001

OTHER PUBLICATIONS

Othman Charles S. Al Hamouz, "Synthesis and Characterization of a Novel Series of Cross-Linked (Phenol, Formaldehyde, Alkyldiamine) Terpolymers for the Removal of Toxic Metal Ions from Wastewater", Arabian Journal for Science and Engineering, vol. 41, No. 1, Mar. 2015, pp. 119-133.

(Continued)

*Primary Examiner* — Tam M Nguyen
(74) *Attorney, Agent, or Firm* — Oblon, McClelland, Maier & Neustadt, L.L.P.

(57) ABSTRACT

The invention is directed to utilization of a series of cross-linked 1,4-benzenediamine-co-alkyldiamine polymers and the use of the polymers to remove mercury from a hydrocarbon in fluid form.

14 Claims, 6 Drawing Sheets

(51) Int. Cl.
*B01J 20/26* (2006.01)
*B01D 15/00* (2006.01)
*B01J 20/28* (2006.01)
*B01J 20/32* (2006.01)
*B01J 20/34* (2006.01)

(52) U.S. Cl.
CPC ....... *B01J 20/3282* (2013.01); *B01J 20/3425* (2013.01); *B01J 20/3475* (2013.01); *C08G 73/0213* (2013.01); *C10L 1/04* (2013.01); *C10L 1/06* (2013.01); *C10G 2300/205* (2013.01); *C10G 2400/02* (2013.01); *C10G 2400/08* (2013.01); *C10L 2200/043* (2013.01); *C10L 2200/0423* (2013.01); *C10L 2270/023* (2013.01); *C10L 2270/04* (2013.01); *C10L 2290/542* (2013.01)

(56) References Cited

U.S. PATENT DOCUMENTS

| | | | |
|---|---|---|---|
| 5,523,067 A | 6/1996 | Markovs | |
| 5,837,032 A * | 11/1998 | Moll | B01D 53/22 95/45 |
| 2006/0249018 A1 | 11/2006 | Wang et al. | |
| 2015/0209733 A1* | 7/2015 | Umehara | B01D 53/228 96/10 |
| 2016/0231271 A1* | 8/2016 | Huang | C08K 3/041 |
| 2016/0332893 A1 | 11/2016 | Al Hamouz | |
| 2017/0066882 A1 | 3/2017 | Mueller et al. | |

OTHER PUBLICATIONS

Oluwafemi S. Akintola, et al., "Removal of mercury (II) via a novel series of cross-linked polydithiocarbarnates", Journal of the Taiwan Institute of Chemical Engineers, Nov. 2015, 15 pages.

International Search Report and Written Opinion dated Aug. 17, 2018 in PCT/IB2018/000517, citing documents AA and AX therein, 14 pages.

Azarudeen, R.S., et al., "Batch Separation Studies for the removal of Heavy Metal Ions Using a Chelating Terpolymer: Synthesis, Characterization and Isotherm Models", Separation and Purification Technology, 2013, vol. 116, XP 28682854, pp. 366-377.

* cited by examiner

MERCURY REMOVAL FROM LIQUID HYDROCARBONS BY 1,4-BENZENEDIAMINE ALKYLDIAMINE CROSS-LINKED POLYMERS

CROSS REFERENCE TO RELATED APPLICATIONS

This application claims priority to U.S. Provisional Application No. 62/486,841, filed Apr. 18, 2017, the disclosure of which is incorporated by reference in its entirety. This application is related to U.S. application Ser. No. 14/712,097, Now U.S. Pat. No. 10/040,698, filed May 14, 2015, which is directed to terpolymers for the removal of toxic metal ions from wastewater and to U.S. application Ser. No. 15/163,360, filed May 24, 2016, which is directed to a cross-linked polymeric resin useful for wastewater treatment. The disclosures of both of these applications are hereby incorporated by reference in their entireties.

BACKGROUND

Field of the Invention

This invention pertains to methods for removing mercury from fluid hydrocarbons such as from liquefied natural gas (LNG), liquefied petroleum gas (LPG), and other petroleum products using benzenediamine alkyldiamine cross-linked polymers.

Description of Related Art

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

Natural gas and crude oils produced in certain geographic areas contain mercury in sufficient quantities to make them undesirable as refinery or petrochemical plant feedstocks. Hydrocarbon condensates derived from natural gas produced in regions of Indonesia and Thailand often contain over 1,000 parts per billion by weight (ppbw) of mercury, while crude oils from the Austral Basin region of Argentina frequently contain over 2,000 ppbw mercury. If these condensates and crudes are distilled without first removing the mercury, the mercury will pass, into the distillate hydrocarbon streams derived from these feeds, such as into naphtha and gas oils, and can poison catalysts such as those used for hydrotreating these streams, as well as other refining catalysts. Liquefied natural gas (LNG) or liquid hydrocarbons recovered from natural gas may also contain mercury in amounts ranging from several ppb (parts per billion) to several thousand ppb depending on its district of production. LPG often is a byproduct of liquefied natural gas (LNG) production and contains mainly C3, C4, and C5 hydrocarbons. Several metals, principally mercury and to a lesser extent antimony, lead, arsenic, and copper, are natural contaminants of LPG as produced from wellhead gases. Mercury concentrations rarely attain levels as high as 1 ppm, nonetheless their presence even at concentrations above 1 ppb can be deleterious.

The presence of mercury causes amalgamation corrosion of aluminum, for example, aluminum used for construction of equipment, and poisons and induces deterioration of catalyst activity when a fluid hydrocarbon containing mercury is used as a raw material, especially when used in a successive catalytic reaction process. For example, mercury at 1-10 ppbw causes corrosion of aluminum which is extensively used in heat exchangers of separation-adsorption trains. Consequently there is a need for the removal of mercury from LPG and other fluid and/or liquid hydrocarbon feedstocks.

Conventional methods for removing mercury from hydrocarbons include the use of adsorbents, gas stripping and chemical precipitation. These methods are generally employed prior to the catalytic processing of a fluid hydrocarbon to circumvent or avoid catalyst poisoning.

Among the adsorbents currently used to remove mercury are charcoal, especially charcoal containing sulfur, U.S. Pat. No. 3,194,629, and other mercury-reactive materials, U.S. Pat. Nos. 4,196,173 and 4,500,327, ion-exchange adsorbents having thiol groups, U.S. Pat. No. 4,950,408, and polysulfides, U.S. Pat. No. 4,591,490, and certain silver oxide impregnated zeolites. Chelating resins containing polyamines for chelating heavy metals in wastewater are also mentioned by US 2017/0066882A1 and U.S. Pat. No. 4,032,484.

The use of fixed bed adsorbents, such as activated carbon (e.g., 30 activated carbon) or granular activated alumina; see e.g., http://_adsorbents.biz/application/mercury_removal.aspx, molecular sieves, metal oxide-based adsorbents and activated alumina, to remove the mercury is a potentially simple approach but has several disadvantages. For example, solids in crude oil tend to plug the adsorbent bed and the cost of the adsorbent may be excessive when mercury levels are greater than 100 to 300 ppbw. Also, large quantities of spent adsorbent are produced when treating hydrocarbon liquids having high levels of mercury, thereby making it necessary to process the spent adsorbent to remove adsorbed mercury before either recycle or disposal of the adsorbent.

To be effective gas stripping must be conducted at high temperature with relatively large amounts of stripping gas. Since crudes contain a substantial amount of light hydrocarbons that are stripped with the mercury, these hydrocarbons must be condensed and recovered to avoid substantial product loss. Moreover, the stripping gas must either be disposed of or recycled, both of which options require the stripped mercury to be removed from the stripping gas.

Chemical precipitation often involves the use of hydrogen sulfide or sodium sulfide to convert mercury in a liquid hydrocarbon into solid mercury sulfide which is then separated from the hydrocarbon liquid. This method requires a large volume of aqueous sodium sulfide solutions which is mixed with the liquid hydrocarbon. The drawbacks of this method include a need to maintain large volumes of two liquid phases in an agitated state to promote contact between the aqueous sodium sulfide solution and the hydrocarbon liquids which in turn can lead to the formation of an oil-water emulsion that is difficult to separate.

These prior methods each have limitations based on their capacity, the degree of metal removal at equilibrium, their regenerability, disposal, ecological or health concerns, or some combination of the above. Consequently, there exists a need for development of alternative or complementary processes that efficiently remove mercury from fluid hydrocarbons while avoiding the disadvantages of conventional techniques.

BRIEF SUMMARY OF THE INVENTION

The inventors have found that benzenediamine alkyldiamine cross-linked polymers efficiently remove mercury from fluid hydrocarbons. These polymers can be deployed to efficiently remove mercury from fluid hydrocarbons.

BRIEF DESCRIPTION OF THE DRAWINGS

FIG. 1 illustrates a process for removing mercury from a fluid hydrocarbon. As shown on the left side of this figure, a 1,4-benzenediamine-co-alkyldiamine polymer according to the invention binds to mercury (Hg). As shown in parallel on the right side of this figure a resin comprising a 1,4-benzenediamine-co-alkyldiamine polymer of the invention is incorporated into a column. As shown by the arrows, a fluid hydrocarbon is passed through the column, mercury binds to the 1,4-benzenediamine-co-alkyldiamine polymer, resulting in production of a mercury-free, fluid hydrocarbon.

FIG. 3 depicts the FT_IR spectra of the synthesized polyamines. Similar peaks were found for the different polyamines as they consist of similar functional groups. Two bands ~1600 cm$^{-1}$ and ~1467 cm$^{-1}$ attributed to —C=C— aromatic ring stretching vibration of benzene-1,4-diamine. A band ~1115 cm$^{-1}$ designated to —C—N— stretching vibration. A peak ~720 cm$^{-1}$ attributed to —CH$_2$— rock the intensity of which increases as the aliphatic chain increases. Peaks ~2925 cm$^{-1}$ and ~2855 cm$^{-1}$ attributed to —C—H asymmetric and symmetric stretching vibrations the intensity of these peaks increases as the aliphatic methylene chain moiety of the alkyl diamine increases.

FIGS. 4A and 4B depict the solid $^{13}$C-NMR CPMAS of An-Buta. Similar peaks were found in the NMR spectra of other polyamines. The spectra reveal a peak ~30 ppm is attributed to the —CH$_2$— of the aliphatic chain. A peak ~55 ppm is attributed to the —CH$^2$— attached to the nitrogen of the alkyldiamine. A peak ~75 ppm is attributed to the —CH$_2$— of the formaldehyde linker between the alkyldiamine and benzene-1,4-diamine Peaks ~125 are attributed to the aromatic carbons of the benzene-1,4-diamine. A peak ~150 ppm is attributed to the carbon attached to the amine group in benzene-1,4-diamine.

FIG. 5 shows the thermogravimetric analysis of the synthesized polyamines. The thermograms shows that the polyamines are stable up to ~200° C. followed by a sharp weight loss that could be attributed to the thermal degradation of the aliphatic chain of the alkyl diamine with a weight loss of ~70% up to 400° C. A gradual weight loss shown from ~400° C.-800° C. is attributed to the carbonization of the aniline aromatic moiety.

DETAILED DESCRIPTION OF THE INVENTION

"Mercury" includes elemental mercury as well as mercury compounds. The term Hg$_{total}$ describes the sum total of all the species of mercury present. Hg$^0$ describes the amount of elemental mercury present which can exist in a gaseous, liquid, or solid phase. Hg$^{2+}$ describes ionic mercury, which may be complexed such as a mercury thiol. Hg$_{ads}$ describes mercury adsorbed to solid particles or metallic surfaces and Hg$_{other}$ describes mercury not described by the species described above. Each of these species is characterized by a characteristic set of properties that define its toxicity, solubility, volatility, thermal stability, and reactivity. Most naturally occurring hydrocarbons contain low levels of mercury. In the case of natural gas, mercury is usually present as elemental mercury and mercury levels as high as 4,400 µg/m$^3$ have been reported. Natural gas liquids and crude oil can contain several ppm of mercury often in different chemical forms. Mercury is present in almost all coal measures as well. Reported levels in U.S. coal, for example, range from 70-33,000 ppb.

"Fluid hydrocarbon" is a substance that continually deforms (flows) under an applied shear stress, or, in simpler terms, a fluid hydrocarbon is a substance which cannot resist any shear force applied to it. This term encompasses gaseous, liquid and fluidized hydrocarbons as well as fluids containing hydrocarbons such as muds, brines, suspensions or emulsions. It also encompasses fluid streams of a liquid hydrocarbon in combination with a gaseous or solid hydrocarbon (e.g., flowable particles of a solid hydrocarbon) or both. In some embodiments, a fluid hydrocarbon will contain substantially no water (e.g., during contact with the polymer of the invention) and in others it may contain 1, 5, 10, 20, 30, 40, 50, 60, 70% by weight or more water (e.g., during a hydrocarbon washing step). In some embodiments, the invention involves contacting a fluid hydrocarbon with at least one benzenediamine alkyldiamine cross-linked polymer.

"Liquid hydrocarbon" is one type of fluid hydrocarbon that comprises a compound made of hydrogen and carbon in a liquid form. It includes saturated and unsaturated hydrocarbons as well as aliphatic or aromatic hydrocarbons. This term refers to a homogenous volume of a liquid hydrocarbon or a volume containing two or more different liquid hydrocarbons or containing a liquid hydrocarbon as one component among others such as an emulsion of a hydrocarbon with an aqueous medium.

A liquid hydrocarbon includes those normally gaseous at ambient temperature but which have been liquefied for storage, loading, transportation, or use as well as those solid at ambient temperature which have been liquefied.

Economically important hydrocarbons include fossil fuels such as coal, petroleum and natural gas and hydrocarbon derivatives such as plastics, paraffin, waxes, solvents and oils.

Common hydrocarbons, which occur in or may be placed into liquid form, include ethane, methane, cyclopropane, propane, methylpropane, butane, methylcyclopropane, cyclobutane, methylbutane, pentane, cyclopentane, dimethylpropane, cyclohexane, hexane, cycloheptane, heptane and octane. Representative aromatic hydrocarbons include benzene, ethylbenzene, toluene, cumene, propylbenzene, dodecylbenzene, isobutylbenzene, alpha-methylstyrene, styrene, m-xylene, o-xylene, p-cymene, and p-xylene.

Liquefied petroleum gas is a liquid hydrocarbon feedstock that can be treated by a method according this invention. However, other liquid hydrocarbons can be treated when having unacceptable mercury content. Examples of such feedstocks include liquefied gas mixtures containing varying fractions from approximately 0.1 to approximately 80% by volume or higher of methane, ethane, propane, butane, pentane and hexane from distillations; downstream liquid or liquefiable hydrocarbon products produced from syngas (which contains hydrogen and carbon monoxide) like LNG, gasoline or diesel, various commercial petroleum refinery and petrochemical process streams such as streams from distillation processes, hydrocracking processes, alkylation processes, dehydrogenation processes, hydrogenation processes, sweetening processes, aromatization processes, oxidation processes, hydroformylation processes, dehydrochlorination processes, etc; light and heavy naphthas; streams from commercial fats and oils processing, such as hydrogenation; streams from petroleum extraction processes such as liquefaction, natural gas processing, etc. A characteristic common to all the feedstocks of this invention is the presence of one or more forms of mercury at a concentration as high as about 5 ppm, although it is rare that levels will exceed 1 ppm, and more usually the metal content will be less than 0.1 ppm. In some parallel embodiments the invention may be used to remove other metals from a liquid hydrocarbon, such as antimony, lead, arsenic, and copper.

A liquid hydrocarbon solution or emulsion may substantially contain only liquid hydrocarbons, such crude oil, shale oil, natural gas condensates, petroleum distillates, and combinations thereof.

It may describe a mixture or emulsion of one or more liquid hydrocarbons with another liquid such as an aqueous medium or a mud or brine containing a liquid hydrocarbon. Such a mixture or emulsion may contain other ingredients such as surfactants, emulsifiers or demulsifiers. In such emulsions mercury may be present in either or both the aqueous (water) phase or the organic (hydrocarbon) phase.

Hydrocarbons may be in a solid, liquid or gaseous form or n combination with water as clathrates. A hydrocarbon, such as a saturated alkane, can be a solid, liquid or gas depending on pressure and temperature. Those skilled in the art can identify suitable liquid hydrocarbons for use in the methods disclosed herein or produce them by condensation or melting based on their known physical characteristics. Under standard conditions, the melting and boiling points of some representative saturated alkanes are described by the table below.

| Name | formula | melting point | boiling point | state at 25° C. |
|---|---|---|---|---|
| methane | CH4 | −183 | −164 | gas |
| ethane | C2H6 | −183 | −89 | gas |
| propane | C3H8 | −190 | −42 | gas |
| butane | C4H10 | −138 | −0.5 | gas |
| pentane | C5H12 | −130 | 36 | liquid |
| hexane | C6H14 | −95 | 69 | liquid |
| heptane | C7H16 | −91 | 98 | liquid |
| octane | C8H18 | −57 | 125 | liquid |
| nonane | C9H20 | −51 | 151 | liquid |
| decane | C10H22 | −30 | 174 | liquid |
| undecane | C11H24 | −25 | 196 | liquid |
| dodecane | C12H26 | −10 | 216 | liquid |
| eicosane | C20H42 | 37 | 343 | solid |
| triacontane | C30H62 | 66 | 450 | solid |

The liquid hydrocarbons described herein will be liquid at a temperature that does not inactivate or substantially impair the capacity of the benzenediamine alkyldiamine crosslinked polymers described herein to bind mercury.

A "hydrocarbon mixture" includes one or more fluid hydrocarbons in combination with another ingredient. These include muds or brines containing fluid or liquid hydrocarbons not necessarily in the form of an emulsion. A demulsifier may be used to separate components, such as aqueous and hydrocarbon components, of such a mixture.

An "emulsified hydrocarbon" is a fluid hydrocarbon in combination with one or more other ingredients, for example, an emulsified hydrocarbon can be a liquid hydrocarbon that has been mixed with Nater and a surfactant to form a homogeneous blend or emulsion. This emulsion may be contacted with a polymer according to the invention to reduce mercury content of the hydrocarbon phase. Alternatively, an emulsion may be demulsified to contain separate liquid hydrocarbon and solvent phases (e.g., water, brine, etc.) one or each of which may be contacted with a polymer according to the invention.

"Demulsifier" describes a substance that helps separate a liquid hydrocarbon from an emulsion or mixture with a solvent such as from brine or water. A demulsifier includes, but is not limited to, dodecyl benzene sulfonic acid (DDBSA), alkyl benzene sulfonic acid, toluene sulfonic acid, di-octyl sulfosuccinate, sulfate ethoxylated sulfate ether, disulfonated alkyl diphenyl, sodium benzene sulfonic acid, sodium alkyl benzene sulfonated, isopropyl amine alkyl benzene sulfonated, methane sulfonic acid (MSA), isopropyl naphthalene sulfonic acid, sodium silicate, trithiocarbonate, dithiocarbamate, hydropolysulfide carbonothioylbis-disodium salt, sulfonated styrene-maleic anhydride copolymer (SSMA), copolymers of acrylic acid and sulfonated hydrophobic, aromatic monomers, poly(methacrylic acid) (PMA), poly(acrylic acid) (PAA), 2-acrylamido-2-methylpropane sulfonic acid (AMPS), ethyl vinyl, acetate polymer, acid catalyzed nonyl phenol resin oxyalkylate, and/or ionic surfactants, and combinations thereof. A demulsifier may be employed in embodiments where an emulsion of a liquid hydrocarbon is contacted with a polymer of the invention, for example, to separate a treated liquid hydrocarbon from water, brine or mud prior to contacting the liquid hydrocarbon with a polymer of the invention. A demulsifier may be used before, during or after contacting a mixture containing a liquid hydrocarbon and mercury with a polymer according to the invention. Demulsification steps and demulsifiers are known in the art and are incorporated by reference to http://_petrowiki.org/Oil_demulsification.

A "dessicant" may be used to remove water from a fluid or liquid hydrocarbon such as from natural gas or natural gas liquids. One process for dehydrating a fluid hydrocarbon is to contact it with a glycol, such as with triethylene glycol, diethylene glycol, or tetratethylene glycol. A glycol dehydration unit may be used to remove water from natural gas and natural gas liquids and other such hydrocarbons. The components and steps of glycol dehydration are known in the art and are incorporated by reference to https://_en.wikipedia.org/wiki/Glycol_dehydration.

A "fluidized hydrocarbon" includes solid hydrocarbons like coal that can be fluidized so that they act like liquids; examples include powdered coal or coal dust. In some embodiments, the invention is directed to mercury removal from a fluidized hydrocarbon or from a fluidized hydrocarbon mixed with a liquid hydrocarbon such as liquefied natural gas (LNG) or liquefied petroleum gas (LPG). A "fluidized hydrocarbon" such as coal dust may be substituted for a liquid hydrocarbon in the methods described herein.

"Gaseous hydrocarbon" is a hydrocarbon in gaseous form. In some embodiments, the invention is directed to mercury removal from, directly from a gaseous hydrocarbon which can be substituted for a liquid hydrocarbon in the methods described herein. Alternatively, a gaseous hydrocarbon may undergo condensation into a liquid hydrocarbon mercury can be removed from the condensed gaseous hydrocarbon using a polymer according to the invention. Hydrocarbons that are normally gaseous at ambient temperature may also be demercurized under supercritical conditions.

"Alkyldiamine" refers to an alkyl moiety having two amine groups or an alkane in which two hydrogens are replaced by $NH_2$ groups, such as:

where m is 1, 2, 3, 4, 5, 6, 7, 8, 9, 10, 11, 12, 13, 14, 15, 16, 17, or 18. A larger value for m can facilitate infusion of an alkyldiamine or aderivative thereof into a hydrophobic liquid. The alkyl moiety of the alkyldiamine is flanked by two terminal amino groups. The alkyl chain may be selected from the group consisting of butane, hexane, octane and decane and can be substituted or unsubstituted. These compounds include, but are not limited to 1,4-diaminobutane (BD), 1,6-diaminohexane (HD), 1,8-diaminooctane (OD), 1,10-diaminodecane (DED) and 1,12-diaminododecane (DDD).

"Benzenediamine" refers to a benzene moiety having two amine groups or benzene in which two hydrogens are replaced by $NH_2$ groups, such as benzene 1,4,-diamine (B-D):

A "Mannich reaction" refers to a multi-component condensation of a nonenolizable aldehyde (e.g. formaldehyde), a primary or secondary amine or ammonia and an enolizable carbonyl compound to afford an aminomethylated product, which is also sometimes called a Mannich base. The Mannich reaction is usually a two-step reaction: addition of the amine group to the carbonyl carbon of the formaldehyde to form an electrophilic immonium or iminium ion followed by attack of the electrophile by the enolizable carbonyl compound. One way to produce the benzenediamine alkyldiamine cross-linked polymers of the invention is via a Mannich reaction.

A "benzenediamine alkyldiamine cross-linked polymer" may be produced from polymerization of one or more benzenediamines with one or more alkyldiamines, for example, by polymerization in the presence of formaldehyde or paraformaldehyde. These polymers include but are not limited to the polymers described by Table 1 and by FIG. 2 and include chemical derivatives retaining an ability to bind to at least one form of mercury. Such polymers may be in the form of a cross-linked polymer powder or in other foams. These polymers comprise long hydrophobic chains which facilitate the removal of mercury from liquid hydrocarbons and may be completely cross-linked.

In a crosslinked polymer covalent bonds connect different chains, and quite literally the molecular weight of such a material can approach infinity. In some non-limiting embodiments the average molecular weight of a benzenediamine alkyldiamine cross-linked polymer is in the range of 1,000-2,000,000 g/mol, 1,500-350,000 g/mol, 2,500-300,000 g/mol, 3,000-100,000 g/mol, or 5,000-50,000 g/mol, as well as any intermediate value or subrange.

In some embodiments a benzenediamine alkyldiamine cross-linked polymer is semi-crystalline and mostly amorphous as determined by its x-ray diffraction pattern.

The present invention also relates to a method for preparing the benzenediamine alkyldiamine cross-linked polymer described above. In one embodiment, the polymerization is achieved through polycondensation of benzenediamine, a diaminoalkane and formaldehyde (in a molar ratio of 1:x:y, x=1-5 and y≥6, for example 1:1-5:6-100) via a Mannich reaction in a reaction medium. The reaction medium can be either an aqueous medium or an organic solvent, such, as ethanol, methanol, water, acetic acid, saturated and unsaturated hydrocarbons such as alkanes and alkenes. In one embodiment, the reaction medium is n-heptane.

Benzenediamine, diaminoalkane and formaldehyde according to the aforementioned molar ratio are mixed in the reaction medium then stirred and heated until the temperatures reaches 80-100° C., preferably 85-95° C., for example, 90° C. as well as any intermediate value or subrange. A curing process takes place when the mixture is kept at the reached maximum temperature for at least 8 h, preferably at least 16 h, more preferably at least 24 h with continuous stirring. As used herein, curing refers to the toughening or hardening of a polymer material by cross-linking of polymer chains, brought about by agents such as electron beams, heat, chemical additives and UV radiation. Accordingly, methods of preparing a benzenediamine-formaldehyde-diaminoalkane cross-linked polymer in the present invention are not limited by the use of heat in the curing process. Due to a formaldehyde/benzenediamine ratio of >1, the curing process does not require a cross-linking agent. After the curing process has been completed, the polymer or resinous material produced can be filtered, crushed, washed and dried.

"Substrate" or "Support" is a solid material to which the polymer of the invention may be bound and is generally non-soluble in, and chemically inert to, a liquid hydrocarbon. It may be monolithic such as a sheet, tube, cylinder, foil, lattice, honeycomb, bed, column or other structure. It may be porous or non-porous to a liquid hydrocarbon. Substrates include pipe, storage, and equipment linings, filaments, fibers, woven fabric, non-woven fabric, particles (including nanoparticles between 1, 10, 100, 500 and 1,000 nm in diameter and microparticles between 0,1, 1, 10, 100, 500, and 1,000 µm in diameter), granules, pellets, filters and sensors. In some embodiments the polymer according to the invention is bound to a substrate or may be incorporated into a substrate. Substrates or supports may be metals, minerals, glasses, ceramics, polymers, carbon (including carbon nanotubules and graphite), organic materials, composite materials, or other solid materials that are not substantially soluble in a liquid hydrocarbon, which are substantially non-reactive with a liquid hydrocarbon, and which can be bound to a polymer according to the invention. In some embodiments, a polymer according to the invention will be coated on or combined with another polymer such as with polystyrene (PS), polyvinyl chloride (PVC), nylon, polyethylene (PE), or polypropylene (PP). In other embodiments, a polymer according to the invention may be bound to an inorganic substrate carrier, such as silica, a zeolite, ceramic, sand or with activated carbon or carbon nanotubes. In some embodiments the substrate is particulate in others fibrous.

In some embodiments, the substrate or support is an organic or mineral, natural or synthetic material with which the mercury-binding polymer of the invention is to facilitate its transportation or handling or to facilitate or stabilize contact with a liquid hydrocarbon containing mercury. The support can be solid (e.g., clays, natural or synthetic silicates, resins, waxes, solid fertilizers) or fluid (e.g., water, alcohols, ketones, petroleum fractions, chlorinated hydrocarbons, liquefied gases). A surfactant which may optionally be present can be an ionic or non-ionic emulsifier, dispersant or wetting agent such as, for example, salts of polyacrylic acids and lignin-sulphonic acids, condensates of ethylene oxide with fatty alcohols, fatty acids or fatty amines. A composition comprising the mercury-binding polymers of the present invention can be prepared in the form of wettable powders, soluble powders, dusting powders, granulates, solutions, emulsifiable concentrates, emulsions, suspended concentrates and aerosols. These can be configured or applied in a manner that enhances contact between the mercury-binding polymer and mercury in a liquid hydrocarbon solution, for example, packed into a column or bed, incorporated into a filter, or dispersed into a liquid hydrocarbon.

A "hydrocarbon stream" describes a fluid hydrocarbon stream that is substantially composed of hydrocarbons. A hydrocarbon stream may be a substantially gaseous hydrocarbon stream, e.g., natural gas, or a liquid hydrocarbon stream or a combination of both gaseous and liquid hydrocarbon products. It may be in a raw or substantially unprocessed form, for example, a stream from an oil or gas well, or in a semi-refined or refined form, such as a feedstream for hydrocarbon cracking or distillation or a stream resulting from these operations. For example, a hydrocarbon steam may comprise natural gas liquids or it may comprise a recycle stream from one or more devices of an apparatus, e.g., gaseous by-products, that may be recycled and added to the hydrocarbon stream. Gaseous by-products may include, e.g., unreacted synthesis gas, and recycle may be accomplished inside or outside of the pressure vessel. The composition of a hydrocarbon stream typically fluctuates over time depending on the source of the stream. That is, the fractions of the specific hydrocarbons may vary as well as any n n-hydrocarbon constituents such as sulfur compounds, nitrogen, water, carbon monoxide, hydrogen, and carbon dioxide. In some embodiments, the invention is directed to contacting a hydrocarbon stream containing mercury with at least one benzenediamine alkyldiamine cross-linked polymer.

In some embodiments, crude oil and/or a hydrocarbon gas is removed from a crude oil well and/or a well in a hydrocarbon containing geologic formation and is passed to a separator for separation into one or more of a gaseous hydrocarbon stream comprising, consisting of, or consisting essentially of hydrocarbons, mercury and water, a liquid hydrocarbon stream comprising, consisting of, or consisting essentially of hydrocarbons, mercury and water, and an aqueous hydrocarbon-containing stream comprising, consisting of, or consisting essentially of water in combination with hydrocarbons, and mercury which is removed from a separator. A mercury-containing fluid hydrocarbon feed, including in part at least a portion of at least one of the gaseous hydrocarbon stream, liquid hydrocarbon stream and the aqueous hydrocarbon-containing stream is charged to a mercury removal unit (MRU) for removal of mercury thereby forming a treated stream. One or more recycle streams comprising a portion of treated gas, liquid or aqueous streams is charged to a contactor for contact with the resin. Through such contacting, at least a portion of the mercury contained in the hydrocarbon stream is transferred to a recycle stream thereby forming a mercury rich gas stream which is removed from the contactor and a treated liquid hydrocarbon stream, which is removed from the contactor.

A mercury removal unit, or a system containing a mercury removal unit, may comprise other elements, such as a particle separator that substantially removes solid particles from a stream entering or leaving a mercury removal unit, a heater for heating a stream, a heat-exchanger or cooling unit for cooling a stream, a washer for washing a stream with water, a desalter for removing salt from a stream, a dehydrator for removing water and other aqueous components from a stream, a fractionation unit that substantially separates liquid and gaseous components of a stream before or after entry into a mercury removal unit, a distillation unit or column to separate different hydrocarbons from each other by selective evaporation and condensation, a water-removal unit that removes water from a stream before or after entry into a mercury removal unit, a gas removal unit that removes gases before or after entry into a mercury removal unit (e.g., acid gases like carbon dioxide, hydrogen sulfide, mercaptans like methanethiol or ethanthiol; other gases including nitrogen or helium), a unit to remove naturally-occurring radioactive material such as radon or radium, a unit for the transformation of non-elemental mercury into elemental mercury, and/or a unit for the capture ardor recovery of mercury or mercury compounds. Such components and others which may also be incorporated into a system that includes a mercury removal unit are known in the art and are disclosed by and incorporated by reference to https://_en-.wikipedia.org/wiki/Natural-gas_processing; or http://_en-.wikipedia.org/wiki/Oil_refinery.

By "removing" mercury from a liquid hydrocarbon, liquefied natural gas, or crude petroleum product is meant any and/or all of partitioning, sequestering, separating, transferring, eliminating, dividing, removing, dropping out of mercury or its compounds from the liquid hydrocarbon or crude oil to any extent. While it is certainly acceptable for all of the mercury to be removed, this method is still considered successful if the level of mercury is reduced. In one non-limiting embodiment, the process reduces mercury content in the crude oil or other liquid hydrocarbon to an acceptable level to be processed in a refinery. In some embodiments, the invention is directed to a method of removing Hg from a solution containing a liquid hydrocarbon by adsorbing the Hg with a cross-linked benzenediamine-formaldehyde-diaminoalkane polymer of the invention in at least one of a batch mode, fixed-bed mode, or column mode. In some embodiments, the invention will reduce the mercury content, or the content of one or more forms of mercury, by 1 to 100% based on the weight of the total mercury or total form of mercury in the fluid hydrocarbon being contacted with a benzenediamine alkyldiamine cross-linked polymer of the invention. This range includes all intermediate values and subranges, such as a reduction in mercury content of 5, 10, 20, 30, 40, 50, 60, 70, 80, 90, or 95%.

In some embodiments, a cross-linked benzenediamine-formaldehyde-diaminoalkane polymer adsorbent is present in the liquid hydrocarbon solution or emulsion (e.g. with an aqueous medium) within a concentration range of 0.1-5.0 g/L (per volume of the treated solution), preferably 0.5-2.5 g/L, more preferably 1.0-2.0 g/L.

In some embodiments, an aqueous component of a solution such as an emulsion containing a liquid hydrocarbon is within a pH range of 4-6, preferably 5-6.

In one or more embodiments, a cross-linked benzenediamine-formaldehyde-diaminoalkane polymer of the present invention is effective in adsorbing Hg in a liquid hydrocarbon or liquid hydrocarbon solution at a temperature of 25-50° C., preferably 35-50° C., more preferably 40-50° C.

In one or more embodiments, the adsorption of Hg ions by a cross-linked benzenediamine-formaldehyde-diaminoalkane polymer of the present invention in liquid hydrocarbon solution is carried out for a duration of 1-5 h, preferably 2-5 h, more preferably 3-5 h. More than 85% of the Hg ions present in the hydrocarbon solution will be successfully removed, preferably more than 90%, more preferably more than 95%, even more preferably more than 99.9%. Advantageously, more than 70% of the Hg ions are removed within the first hour.

In one or more embodiments, the Hg adsorption capacity of a cross-linked benzenediamine-formaldehyde-diaminoalkane polymer increases when the initial concentration of Hg ions in the aqueous solution increases. The initial concentration of Hg ions in a liquid hydrocarbon solution is in the range of 50-136 mg/L, preferably 84-136 mg/L, more preferably 110-136 mg/L.

In one or more embodiments, the Hg adsorption capacity of a cross-linked benzenediamine-formaldehyde-diaminoalkane polymer increases when the number of carbon atoms in the alkyl chain of diaminoalkane decreases. For example, at pH 5, 25° C., for a duration of 4 h and at a polymer concentration of 1.5 g/L, the Hg, adsorption capacities of Ph-Buta, Ph-Hexa, Ph-Octa and Ph-Deva are 84-88 mg/L, 48-52 mg/L, 24-28 mg/L and 12-16 mg/L, respectively. In some embodiments a cross-linked benzenediamine-formaldehyde-diaminoalkane polymer of the present invention has a Hg adsorption capacity of 10-90 mg/L under the described conditions.

In some embodiments one or more Hg ions or atoms are coordinated to one or more nitrogen atoms of an adsorbent comprising a polymer according to the invention.

In one or more embodiments, the maximum adsorption capacity of Hg or other metals on the cross-linked benzenediamine-formaldehyde-diaminoalkane polymer is within the range of 1250 mg/g, preferably 10-250 mg/g, more preferably 30-250 mg/g.

In one or more embodiments, the cross-linked benzenediamine-formaldehyde-diaminoalkane polymer adsorbent is also effective in removing, apart from Hg, other metal ions such as Co, Cu, Fe, Zn, As, Sr, Mo, Cd, and Pb from a liquid hydrocarbon.

In some embodiments, a benzenediamine alkyldiamine cross-linked polymer that has bound mercury or another metal may be regenerated by removing the metal leaving the crosslinked polymer free toagain bind mercury or another metal. Removal may be achieved by acid treatment (e.g., with HCl) of a benzenediamine alkyldiamine cross-linked polymer regenerative adsorbent, followed by basification and washing out dissolved mercury. In other embodiments, the benzenediamine aikyldiamine cross-linked polymer may fonts part of a non-regenerative sorbent bed which is periodically replaced when saturated with mercury or another metal.

In some embodiments, the method of the invention may be employed in conjunction with a conventional mercury removal method such as those described herein. The method according to the invention may be performed before, simultaneously with, or after another kind of mercury removal treatment.

EMBODIMENTS

The description and specific examples while indicating embodiments of the technology are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the embodiments described herein, and other embodiments not specifically described herein, will be apparent to those of skill in the art upon reviewing the above description.

Representative embodiments include without limitation the following:

A 1,4-benzenediamine-co-alkyldiamine polymer which may be isolated from other polymers or components or may form a portion of copolymer or be incorporated into another material such as a resin. Complexes of a 1,4-benzenediamine-co-alkyldiamine polymer with mercury, a mercury compound or another heavy metal. A 1,4-benzenediamine-co-alkyldiamine polymer derivative that has been substituted on a ring or non-ring (e.g. alkylene) position with a halogen such as F, Cl, I or Br, C1-C6 alkyl, amino, amine, alkylamine, hydroxyl, or C1-C6 alkoxy. Also, substrates or supports covalently or non-covalently bound to a 1,4-benzenediamine-co-alkyldiamine polymer or its mercury-binding derivatives or solutions, columns, bed, filters, linings, membranes or other structures or objects containing, said polymer or derivatives.

A method for removing, mercury from a fluid or liquid hydrocarbon comprising contacting the liquid hydrocarbon with a 1,4-benzenediamine-co-alkyldiamine polymer, a salt thereof or a derivative thereof. This polymer may be unbound (e.g., in a form of a powder) or bound to a substrate such as a surface or particle (e.g., as a powder coating or as a component of the surface or particle). It may be present in or bound to a filter through which a fluid or liquid hydrocarbon is passed. It may be present on particles or granules in a batch mixture with a fluid liquid hydrocarbon or on particles or granules packed into a column or structure. This method may be performed once on a volume of a fluid or liquid hydrocarbon or repeated 2, 3, 4, 5 or more times on new or recycled portions of a polymer of the invention.

Average particle size of a particle comprising a polymer according to the invention is preferably selected to maximize contact and binding between mercury and the polymer of the invention and accessibility of mercury to the polymer. In some embodiments, an average particle diameter or particles made or coated with a polymer of the invention will range from 1, 5, 10, 25, 50, 75, 100, 200, 300, 400, 500, 600, 700, 800, 900, to 1,000 µm or any intermediate value or subrange.

The mercury contained in the liquid hydrocarbon may be elemental mercury, ionized mercury (e.g., $Hg^+$ and/or $Hg^{2+}$), ionizable mercury or organic mercury or mixtures of two or more of these. In some embodiments the mercury present in the fluid hydrocarbon is complexed with one or more components of the fluid hydrocarbon such as for example a nitrogen- and/or sulfur-containing material, or one or more non-hydrocarbon components present in the hydrocarbon fluid such as water, $CO_2$, $H_2S$ and the like.

The liquid hydrocarbon may be liquid a room temperature (25° C.) or below or liquid at a higher temperature so long as the temperature does not substantially inactivate the ability of the polymer to bind one or more forms of mercury or otherwise degrade the polymer. In some embodiments a gaseous hydrocarbon is liquefied and then contacted with a polymer according to the invention. In other embodiments a hydrocarbon that is solid at room temperature is heated to produce a liquid hydrocarbon that can be contacted with a polymer according to the invention. Examples of liquid or liquefiable hydrocarbons include C1-C4 gases such as liquefied petroleum gas or natural gas, C5-C9 hydrocarbons such as naphta, C5-C10 hydrocarbons such as petrol or gasoline, C10-C16 hydrocarbons such as kerosene or paraffin oil, C14-C20 hydrocarbons such as diesel oils, C20-050 hydrocarbons such as lubricating oil, C20-C70 hydrocarbons such as fuel oil, and C70+ hydrocarbons such as bitumen used for roads and roofing. Additional hydrocarbons and carbon ranges are incorporated by reference to http://_www.caslab.com/Petroleum-Hydrocarbon-Ranges/ (last accessed Jun. 19, 2017).

In other embodiments, the fluid or liquid hydrocarbon may be in mixture or admixed with another fluid, such as an aqueous medium. In some embodiments, the liquid hydrocarbon will be part of an emulsions for example, with a hydrophilic or aqueous solvent and optionally a surfactant or emulsifying agent.

In other embodiments, the fluid hydrocarbon may be a fluidized hydrocarbon such as fluidized solid hydrocarbon such as coal or micro- or nanoparticles of coal or carbon. Such a fluidized, hydrocarbon is not necessarily in a liquid state but exhibits fluid properties of a liquid and can be contacted with a polymer according to the invention.

A some embodiments the 1,4-benzenediamine-co-alkyldiamine polymer is produced from benzene-1,4-diamine (B-D), paraformaldehyde or formaldehyde, and at least one diaminoalkane selected from the group consisting of 1,-4-diaminobutane (BD), 1,6-diaminohexane (HD), 1-8-diaminooctane (OD), 1,10-diaminodecane (DED), and 1,12-diaminododecane (DDD). According to these embodiments, the liquid hydrocarbon is contacted with a 1,4-benzenediamine-co-alkyldiamine polymer that is produced from benzene-1,4-diamine (B-D), paraformaldehyde, and at least one diaminoalkane selected from the group consisting of 1,4-diaminobutane (BD), 1,6-diaminohexane (HD), and 1-8-diaminooctane (OD).

In yet other embodiments, the invention is directed to an apparatus or device for reducing content of mercury in a liquid hydrocarbon comprising at least one 1,4-benzenediamine-co-alkyldiamine polymer and a fluid or liquid hydrocarbon. This apparatus or device may configured so that the liquid hydrocarbon flows through the apparatus while contacting the at least one 1,4-benzenediamine-co-alkyldiamine polymer. In other embodiments, the apparatus or device is configured so that the at least one 1,4-benzenediamine-co-alkyldiamine polymer is bound to a porous filter or to one or more sheets through which a liquid hydrocarbon containing elemental or organic mercury can flow.

A column may be present in any of a packed column, a tray-type column, fixed-bed or fluid-bed, while a packed column is preferable. Also, a heating device can be installed in or near the column to control the temperature thereof. In the packed column, the temperature is 40 to 160° C., preferably 80° C., and the pressure is 0.005 to 10.00 MPaG, preferably 0.01 to 1 MPaG, preferably 0.05 MPaG to 0.5 MPaG. The feed rate of the fluid hydrocarbon to the column is for example 2,000 to 150,000 kg/m hr, preferably 5,000 to 100,000 kg/in hr, 500 to 10,000 kg/m hr. preferably 800 to 5,000 kg/m hr. Where "hr" "G", and "L" represent hours, gas, and liquid, respectively. The linear velocity of a gas hydrocarbon fluid to be processed in relation to an adsorbent is 0.1 to 20.0 m/sec, preferably 0.2 to 0.10 preferably 0.5 to 1.0 m/sec.

In one embodiment the resin comprising a benzenediamine alkyldiamine cross-linked polymer is used to coat a shaped substrate and the coated and shaped substrate is used as an absorbent for removing mercury from the fluid hydrocarbon. The shaped substrate may be in any shape such as spherical, oblong, irregular, cuboidal, ring shape, cylindrical, or the shape of Raschig ring. The substrate may be hollow, solid or porous. Shaped substrates and/or particles of resin may be used in the form of a packed bed. A plurality of the shaped substrates and/or particles of the resin are typically used to at least partially fill a columnar structure, vessel and/or space. The shaped substrate and/or resin particles can be packed in a random or stacked fashion. Random packing is achieved by arbitrarily mixing and filling a vessel having an inlet and an outlet at points that maximize contact of the fluid hydrocarbon with the resin particles and/or resin coated shaped substrate.

In one embodiment the resin particles and/or shapes coated with resin are wetted prior to contact with the mercury-contaminated hydrocarbon fluid. The resin can be wetted with a swelling agent such as a solvent in which the resin is ordinarily at least partially soluble, or with a liquid material in which the resident is ordinarily not soluble. For example, a non-water soluble resin may be wetted with water and/or an aqueous solution. Wetting the resin may improve the capability of the resin to remove mercury from the fluid hydrocarbon. Preferably the resin is wetted only to the point of full absorption of the wetting agent and not to the point where the resin is coated with a liquid.

Alternately the resin may be coated on a shaped surface in a regular manner. For example, in one embodiment the tube surfaces of a heat exchanger-type device are coated with the resin such that the fluid hydrocarbon passes through the tubes of the heat exchanger in direct contact with a resin-coated surface of the heat transfer piping. The heat exchanger structure may be used passively at ambient temperature without a heat transfer medium to affect a temperature change of the fluid hydrocarbon, or may be used actively such that the hydrocarbon fluid is heated and/or cooled as it passes through the heat exchanger and is in contact with the resin.

In a still further embodiment the absorption or removal of mercury from a fluid hydrocarbon occurs in the three-phase manner. For example, the fluid hydrocarbons may be in a gaseous state that is passed over resin particles and/or coated and shaped substrates that are coated with a liquid swelling agent or absorption/removal agent. The removal agent is preferably in liquid form and acts as a mercury transfer medium to convey mercury atoms from the gaseous hydrocarbon phase onto the solid resin phase through the liquid absorption agent. The liquid absorption agent in this and other embodiments of the invention may further include other agents to enhance mercury-absorption, mercury-transfer and mercury-removal rate of mercury from the fluid hydrocarbon to the resin and/or resin surface.

The size of the resin particles and/or the size and/or distribution of size of the resin particles and/or resin-coated, shaped substrates may vary depending on the pressure at which the fluid or liquid hydrocarbons contact the resin and/or the throughput of the fluid hydrocarbon on course to through the resin particles and/or resin-coded shaped substrates. In a still further embodiment of the invention the resin particles and/or resin, coated substrate shapes may function as a fluidized bed with an adsorption column and/or packed column. For example, the fluid hydrocarbons may be passed at a high throughput through an absorption cartridge and/or column such that the resin particles and/or resin coated substrate particles are fluidized by passage of the gas through the packed bed of resin particles and/or resin coated substrate shapes.

In still a further embodiment the fluid hydrocarbons are first passed through a liquid comprising one or more absorption and/or mercury removal agents. For example, the hydrocarbon fluid stream to be demercurized can affect capability for transferring/or removing mercury of the other aspects of the disclosure.

In still a further embodiment of the invention the columnar mercury removal unit may contain substrate fibers comprising or coated with a benzenediamine alkyldiamine cross-linked polymer or particles thereof. The fibers may be formed such that they are of short fiber length and/or a form such that they represent an ordered structure such as a fabric.

In still a further embodiment of the invention the resin particles further include one more adjuvants and/or fillers to aid in removal of mercury from liquid hydrocarbons such as for example to enhance absorption of mercury on to the hydrocarbon.

The amount of mercury present in the fluid hydrocarbon may be reduced by amounts of, for example, 1 to 100% based on the weight of the mercury present, in the untreated hydrocarbon fluid in comparison to the weight of the mercury present in the treated or dematerialized hydrocarbon fluid. Preferably the mercury is reduced to an amount of 5-90% of the weight of the mercury in the untreated hydrocarbon fluid, more preferably, 10-80%, 20-70%, 30-60%, 40-50%. The ranges disclosed herein include all intermediate values and subranges. In some embodiments the content of one or more particular mercury compounds or forms of mercury, such as alkylmercury or elemental mercury will be reduced from 1 to 100% based on the weight of the one or more particular mercury compounds or forms or mercury, for example, the weight of methyl-mercury will be reduced by at least 95% compared to its weight in a fluid hydrocarbon.

In a particularly preferred embodiment of the invention mercury is removed from the fluid hydrocarbon without mixing or contacting the fluid hydrocarbon with an amount of one or more sulfur compounds and/or sulfur-containing materials other than the sulfur present in the fluid hydrocarbon derived from sources such as natural gas, a natural gas liquids or other fluid/liquid petroleum or mineral oil source. In other embodiments of the invention the fluid hydrocarbons of the invention are no contacted with any carbon-based adsorbents such as activated carbon for removal of mercury. Instead, the fluid hydrocarbon is contacted with the resin to remove mercury without mercury removal currying by adsorption onto a treated or untreated carbon absorbed.

In other embodiment of the invention the resin may be treated with one or more modifiers prior to contact with the fluid hydrocarbon. Such treatment may include contacting the resin with a metal- or main group element-containing solution or composition. Examples of such compositions include potassium iodide, aluminum and aluminum ions, and/or other precious metal-type adsorbents or catalysts. Such absorption agents may be present in an amount of, for example, 10-200% by weight based on the total weight of the resin and the absorbent agent, preferably 20-150% by weight, 30-100% by weight, 40-90% by weight, 50-81% by weight, 60-71% by weight.

The adsorption apparatus and or adsorption system may treat the fluid hydrocarbon (e.g., crude oil, liquefied natural gas or derivatives thereof) in one or more treatment units prior to or after contact with the resin to remove mercury. For example, the fluid hydrocarbon from a well or other point source may be contacted with the resin prior to entering a separator to remove water and/or an aqueous phase from the fluid hydrocarbon. Multiple water or particle separators may be employed. The fluid hydrocarbon may then be subject to dehydration to remove residual water, noxious eases such as $H_2S$ and other materials. The dehydration unit made also function as an electrostatic treater, degasser or desalter. At any stage the fluid hydrocarbon may be treated by storage in a tank. In the case of liquid hydrocarbons such as crude oil the fluid hydrocarbon may be allowed to settle and/or degas in a storage tank. The demurcurizing unit can be present before or after any of the aforementioned stages. Preferably the demurcurizing unit is the first treatment to which the crude oil, natural gas or derivative thereof is first chemically modified to form a new feed hydrocarbon source.

In other embodiments, the apparatus or device may be configured for batch processing of a fluid hydrocarbon, for example, by circulating, agitating or stirring it with particles or granules containing or coated with a polymer according to the invention, and optionally configured to remove particles or granules to which mercury has bound by filtration, sedimentation or centrifugation. A circulating, agitating or stirring device such as a stirrer or propeller may be coated or contain a polymer according to the invention.

In some embodiments the apparatus or device comprises a space for mixing a fluid hydrocarbon with particles of at least one 1,4-benzenediamine-co-alkyldiamine polymer, particles of the at least one 1,4-benzenediamine-co-alkyldiamine polymer, and a fluid hydrocarbon. It may further comprise a filter, centrifuge, or other separation device for separating the fluid hydrocarbon from the particles.

In other embodiments the apparatus or device comprises a container, pipe or other transport device for a fluid hydrocarbon and that has at least one surface in contact with the fluid hydrocarbon which is coated or lined with a 1,4-benzenediamine-co-alkyldiamine polymer.

EXAMPLES

The following examples illustrate various aspects of the present invention. They are not to be construed to limit the claims in any manner whatsoever.

Example 1: Synthesis of Polyamines

Materials and Methods

Benzene-1,4-diamine (B-D), paraformaldehyde, 1,4-diaminobutane (BD), 1,6-diaminohexane (HD), 1,8-diaminooctane (OD), 1,10-diaminodecane (DED) and 1,12-diaminododecane (DDD) from Fluka Chemie AG (Buchs, Switzerland) were used as received. All solvents were of analytical grade. Infrared spectra were recorded on a Perkin Elmer 16F PC FTIR in the 500-4000 $cm^{-1}$ region (FT-IR). 13C-NMR solid state spectra were recorded on a Broker WB-400 spectrometer. Thermogravimetric analysis (TGA) was performed using a thermal analyzer (STA 429) by Netzsch (Germany). X-ray analysis was performed on Rigaku Rint D/max−2500 diffractometer using Cu Kα radiation (wave length=1.5418 A) in a scanning range 2θ=5–50°.

In a typical experiment benzene-1,4-diamine (0.01 mol), diaminoalkane (0.02 mol) and paraformaldehyde (0.04 mol) in 25 ml DMF were stirred for 24 hours at 90° C. Upon completion of the reaction, the polymers were dumped and washed several times with methanol and then dried at 60° C. under vacuum until constant weight is achieved (Table 1).

TABLE 1

Elemental analysis of the resulted synthesized polyamines

| Polymer | Yield % | Carbon | Hydrogen | Nitrogen |
|---------|---------|--------|----------|----------|
| B-DBD   | 56      | 54.17  | 8.44     | 21.83    |
| B-DHD   | 62      | 66.06  | 10.28    | 20.41    |
| B-DOD   | 69      | 69.87  | 11.58    | 17.66    |
| B-DDED  | 71      | 71.89  | 12.31    | 14.95    |
| B-DDDD  | 73      | 71.96  | 10.19    | 14       |

Yield (%) = (mass of product/mass of reactants) × 100%.

Synthesis of Aniline Based Polyamines

Figure 1:
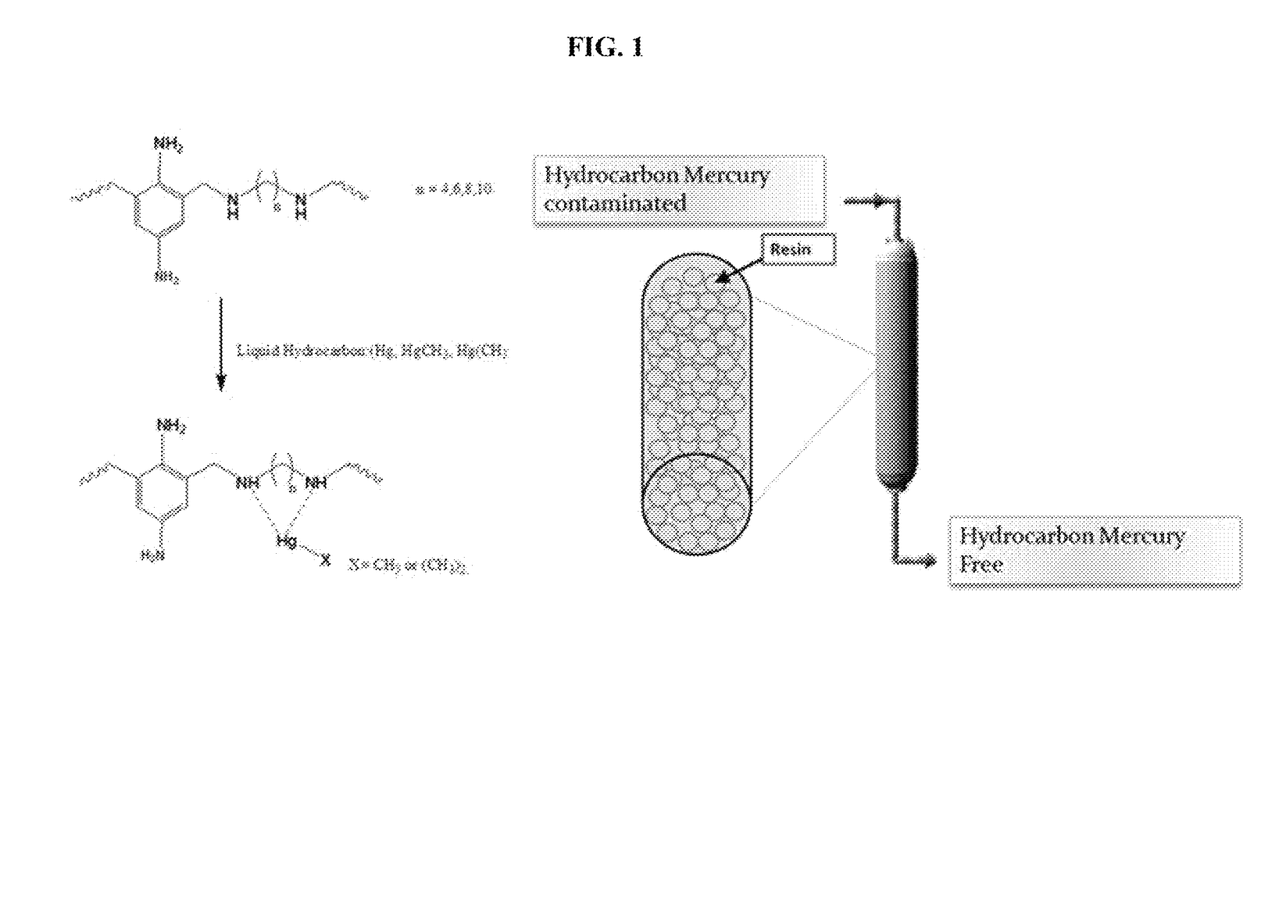
Figure 2:
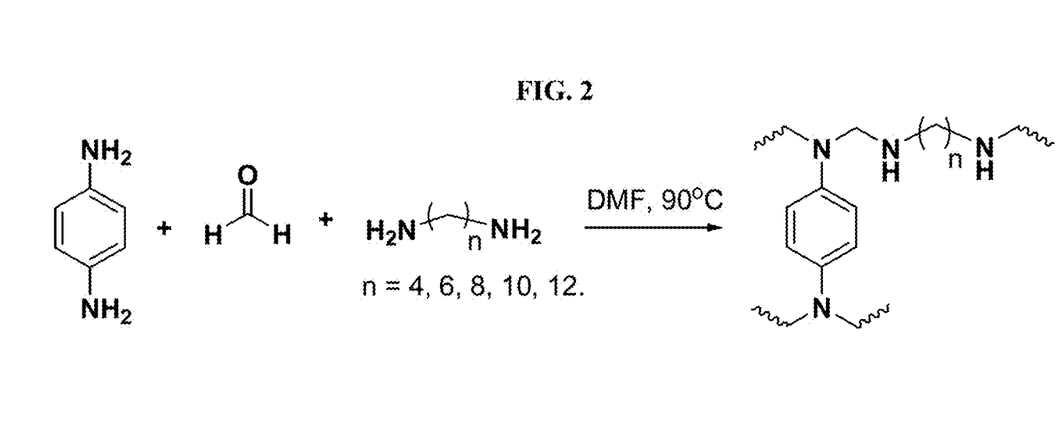
FIG. 2 depicts the polyamines were synthesized by Mannich polycondensation reaction of benzene-1,4-diamine, paraformaldehyde and various alkyl diamines as shown in FIG. 2.
Figure 3:
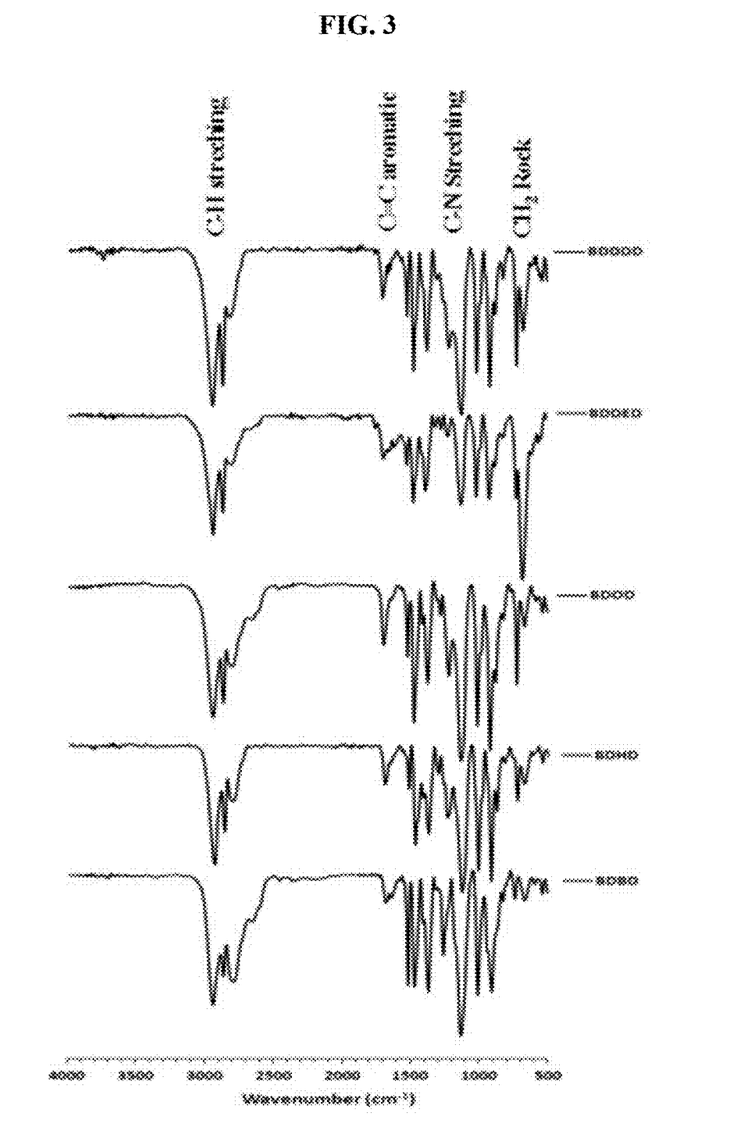

The polyamines were synthesized by Mannich polycondensation reaction of benzene-1,4-diamine, paraformaldehyde and various alkyl diamines as shown in FIG. 2. The FT_IR spectra of the synthesized polyamines are shown by FIG. 3. Similar peaks were found for the different polyamines as they consist of similar functional groups. Two bands ~1600 cm$^{-1}$ and ~1467 cm$^{-1}$ attributed to —C═C— aromatic ring stretching vibration of benzene-1,4-diamine A band ~1115 cm$^{-1}$ designated to —C—N— stretching vibration. A peak ~720 cm$^{-1}$ attributed to —CH$_2$— rock the intensity of which increases as the aliphatic chain increases. Peaks ~2925 cm$^{-1}$ and ~2855 cm$^{-1}$ attributed to —C—H asymmetric and symmetric stretching vibrations; the intensity of these peaks increases as the aliphatic methylene chain moiety of the alkyl diamine increases; see Azarudeen, R. S., et al., *Batch separation studies for the removal of heavy metal ions using a chelating terpolymer: Synthesis, characterization and isotherm models*. Sep. Purif. Technol., 2013. (Copyright © 2014 American Chemical Society (ACS). All Rights Reserved.): p. 366-377; Bellamy, L. J., *The Infrared Spectra of Complex Molecules*. 3rd Ed. 1975, London: Chapman and Hall. 433 pp. and Stuart, B. H., *Infrared Spectroscopy-Fundamentals and Applications*. 2004, Chichester, West Sussex: John Wiley & Sons. 248 pp.

Figures 4A, 4B:
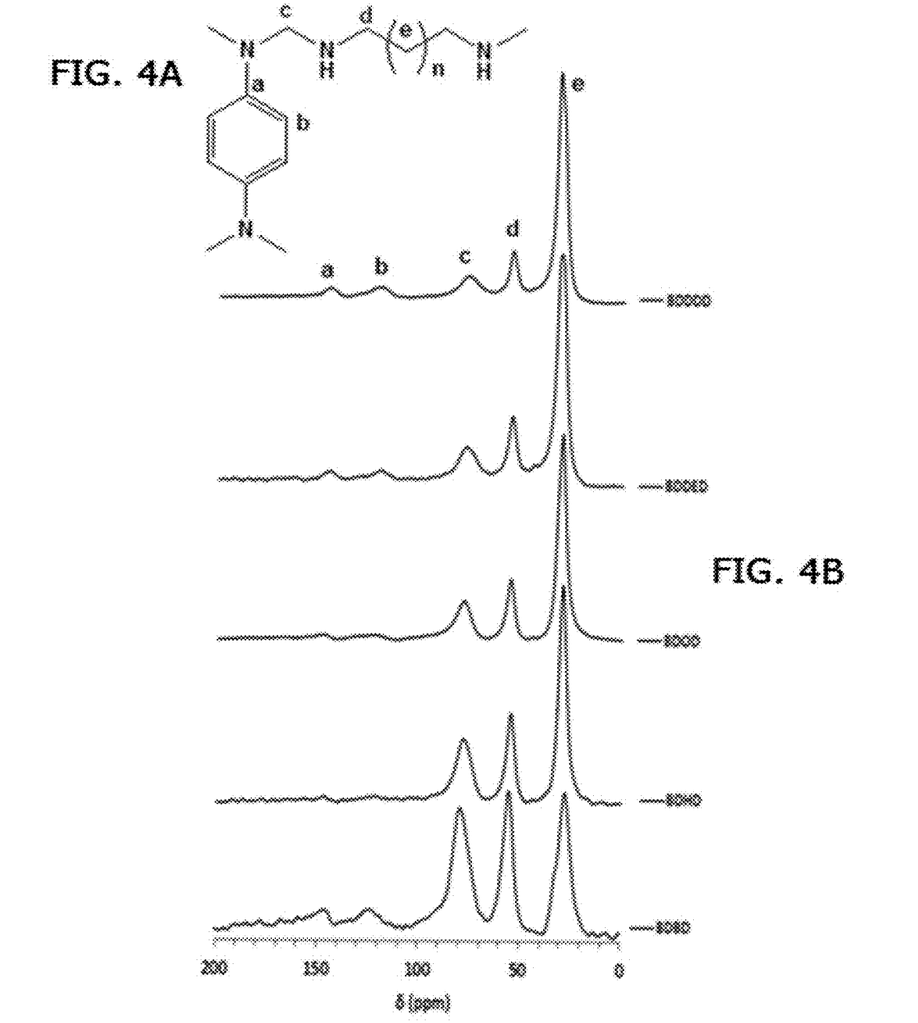

The solid $^{13}$C-NMR CPMAS of An-Bata str are shown by FIGS. 4A and 4B. Similar peaks were found in the NMR spectra of other polyamines. The spectra reveals a peak ~30 ppm is attributed to the —CH$_2$— of the aliphatic chain. A peak ~55 ppm is attributed to the —CH$_2$— attached to the nitrogen of the alkyldiamine. A peak ~75 ppm is attributed to the —CH$_2$— of the formaldehyde linker between the alkyldiamine and benzene-1,4-diamine. Peaks ~125 are attributed to the aromatic carbons of the benzene-1,4-diamine. A peak ~150 ppm is attributed to the carbon attached to the amine group in benzene-1,4-diamine; see Rego, R., et al., *Fully quantitative carbon-13 NMR characterization of resol phenol-formaldehyde prepolymer resins*. Polymer, 2004. 45 (Copyright © 2014 American Chemical Society (ACS). All Rights Reserved.): p. 33-38; Georgakopoulos, A., *Aspects of solid state 13C CPMAS NMR spectroscopy in coals from the Balkan Peninsula*. J. Serb. Chem. Soc., 2003. 68(Copyright © 2014 American Chemical Society (ACS). All Rights Reserved.): p. 599-605; and Chuang, I. S., G. E. Maciel, and G. E. Myers, Carbon-13 *NMR study of curing in furfuryl alcohol resins*. Macromolecules, 1984. 17(Copyright © 2014 American Chemical Society (ACS). All Rights Reserved.): p. 1087-90.

Figure 5:
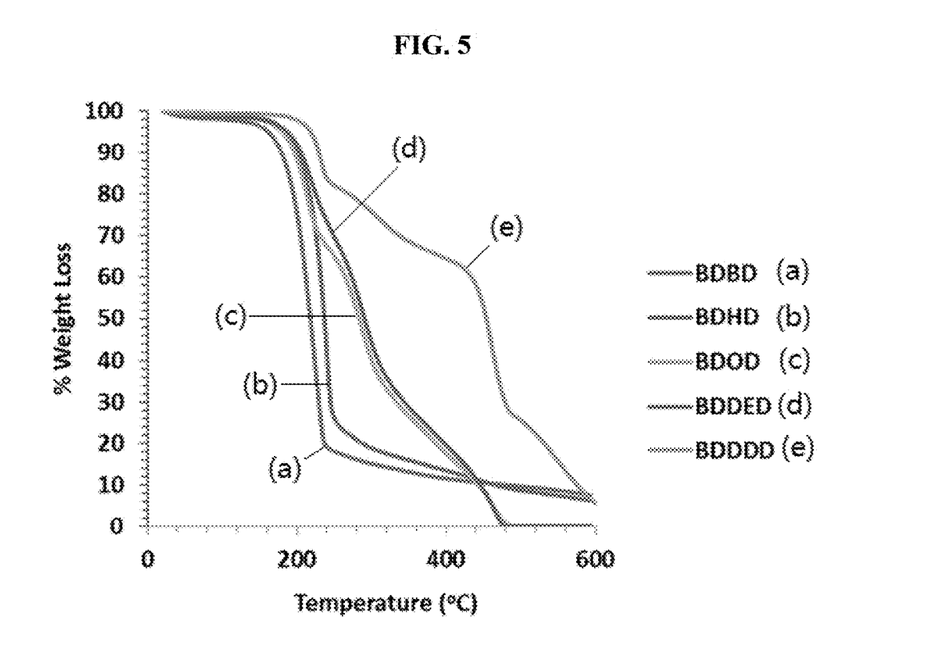

The thermogravimetric analysis of the synthesized polyamine appears in FIG. 5. The thermograms shows that the polyamines are stable up to ~200° C. followed by a sharp weight loss that could be attributed to the thermal degradation of the aliphatic chain of the alkyl diamine with a weight loss of ~70% up to 400° C. A gradual weight loss shown from ~400° C.-800° C. is attributed to the carbonization of the aniline aromatic moiety; see Muylaert, I., et al., *Ordered mesoporous phenolic resins: Highly versatile and ultra stable support materials*. Advances in Colloid and Interface Science, 2012. 175(0): p. 39-51.

Figure 6:
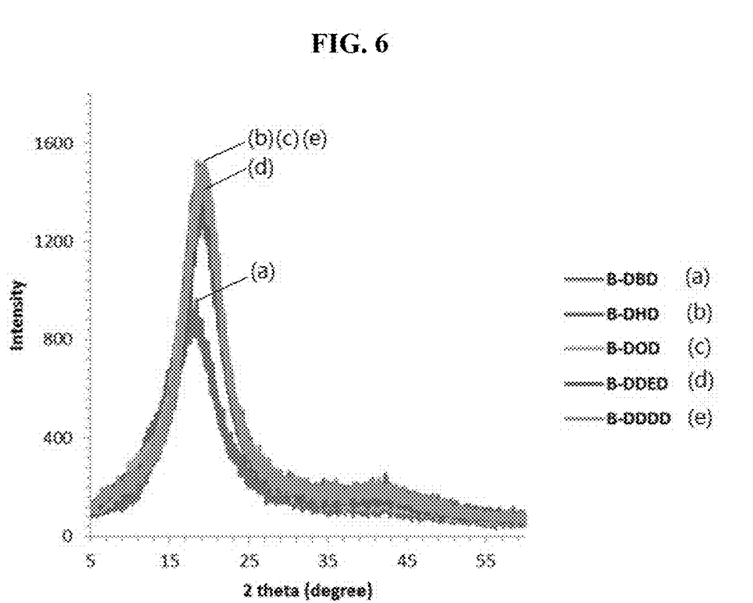
FIG. 6 depicts the powder x-ray patterns revealing an increase in the crystalline behavior of the synthesized polymers which could be attributed by the increase in the aliphatic chain moiety; providing better packing and hence crystallinity.

The powder x-ray patterns in FIG. 6 reveal an increase in the crystalline behavior of the synthesized polymers which could be attributed by the increase in the aliphatic chain moiety; providing better packing and hence crystallinity; see Blackwell, J., M. R. Nagarajan, and T. B. Hoitink, *Structure of polyurethane elastomers: effect of chain extender length on the structure of MDI/diol hard segments*. Polymer, 1982. 23(Copyright © 2014 American Chemical Society (ACS). All Rights Reserved.): p. 950-6.

The description of technology herein is merely exemplary in nature of the subject matter, manufacture and use of one or more inventions and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise.

As used herein, the term "and/or" includes any and all combinations of one or more of the associated listed items and may be abbreviated as "/".

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Throughout this specification and the claims which follow, unless the context requires otherwise, the word "comprise", and variations such as "comprises" and "comprising" means various components can be co-jointly employed in the methods and articles (e.g., compositions and apparatuses including devices and methods).

Although the terms "first" and "second" may be used herein to describe various features/elements (including steps), these features/elements should not be limited by these terms, unless the context indicates otherwise. These terms may be used to distinguish one feature element from another feature/element. Thus, a first feature/element discussed below could be termed a second feature/element, and similarly, a second feature/element discussed below could be termed a first feature/element without departing from the teachings of the present invention.

Although various illustrative embodiments are described herein any of a number of changes may be made to varices embodiments without departing from the scope of the invention as described by the claims. For example, the order in which various described method steps are performed may often be changed in alternative embodiments, and in other alternative embodiments one or more method steps may be skipped altogether.

Optional features of various device and system embodiments may be included in some embodiments and not in others. Therefore, the foregoing description is provided primarily for exemplary purposes and should not be interpreted to limit the scope of the invention as it is set forth in the claims.

Spatially relative terms, such as "under", "below", "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it an be directly connected, attached or coupled to the other feature or element or intervening features or elements may be present. In contrast, when a feature or element is referred to as being "directly connected" "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As used herein in the specification and claims including as used in the examples and unless otherwise expressly specified, all numbers may be read as if prefaced by the word "substantially", "about" or "approximately," even if the term does not expressly appear. The phrase "about" or "approximately" may be used when describing magnitude and/or position indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value for range of values), etc. Any numerical range recited herein is intended to include all sub-ranges subsumed therein.

Disclosure of values and ranges of values for specific parameters (such as temperatures, molecular weights, weight percentages, particle size, etc.) are not exclusive of other values and ranges of values useful herein. It is envisioned that two or ore specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it is also envisioned that Parameter X may have other ranges of values including 1-9, 2-9, 3-8, 1-8, 1-3, 1-2, 2-10, 2.5-7.8, 2-8, 2-3, 3-10, and 3-9, as mere examples.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

The headings, including "Background" and "Summary", and sub-headings used herein are intended only for general organization of topics within the present invention and are not intended to limit this disclosure. The subject matter disclosed in the "Background" may encompass novel aspects of the invention and is not necessarily limited to only description of prior art.

Subject matter disclosed in the "Summary" is not an exhaustive or complete disclosure of the entire scope of the technology or any embodiments thereof.

Classification or characterization of a material or step within a section of this specification as having a particular utility is made for convenience. No inference should be drawn that the material or step must necessarily or solely function in accordance with a partial description thereof in a particular section or that such material or step be limited to a particular outcome or use.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears. The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to, the accuracy of the content of such references.

The invention claimed is:

1. A method for removing mercury from a fluid hydrocarbon comprising contacting the fluid hydrocarbon with a 1,4-benzenediamine-co-alkyldiamine polymer for a time and under conditions sufficient for mercury to bind to the polymer, thereby removing the mercury from the fluid hydrocarbon.

2. The method of claim 1, wherein the mercury is methylmercury or another organomercury compound.

3. The method of claim 1, wherein the mercury is elemental mercury.

4. The method of claim 1, wherein the fluid hydrocarbon is a liquefied gaseous hydrocarbon.

5. The method of claim 1, wherein the fluid hydrocarbon is liquefied natural gas.

6. The method of claim 1, wherein the fluid hydrocarbon is liquefied petroleum gas containing C1-C3 hydrocarbons.

7. The method of claim 1, wherein the fluid hydrocarbon is gasoline or petrol.

8. The method of claim 1, wherein the fluid hydrocarbon is kerosene or jet fuel containing C12-C16 hydrocarbons.

9. The method of claim 1, wherein the fluid hydrocarbon is oil containing C15-C18 hydrocarbons.

10. The method of claim 1, wherein the fluid hydrocarbon is an oil containing a C19 or greater hydrocarbon.

11. The method of claim 1, wherein the fluid hydrocarbon is an emulsified hydrocarbon containing water.

12. The method of claim 1, wherein the fluid hydrocarbon is a fluidized hydrocarbon.

13. The method of claim 1, wherein the 1,4-benzendiamine-co-alkyldiamine polymer is produced from
benzene-1,4-diamine (B-D),
paraformaldehyde or formaldehyde, and
at least one diaminoalkane selected from the group consisting of
1,-4-diaminobutane (BD),
1,6-diaminohexane (HD),
1-8-diaminooctane (OD),
1,10-diaminodecane (DED), and
1,12-diaminododecane (DDD).

14. The method of claim 1, comprising contacting the fluid hydrocarbon which may contain absorbed water with a 1,4-benzenediamine-co-alkyldiamine polymer that is produced from benzene-1,4-diamine (B-D), paraformaldehyde, and at least one diaminoalkane selected from the group consisting of
1,4-diaminobutane (BD),
1,6-diaminohexane (HD), and
1-8-diaminooctane (OD).

* * * * *